United States Patent Office 3,438,268
Patented Apr. 15, 1969

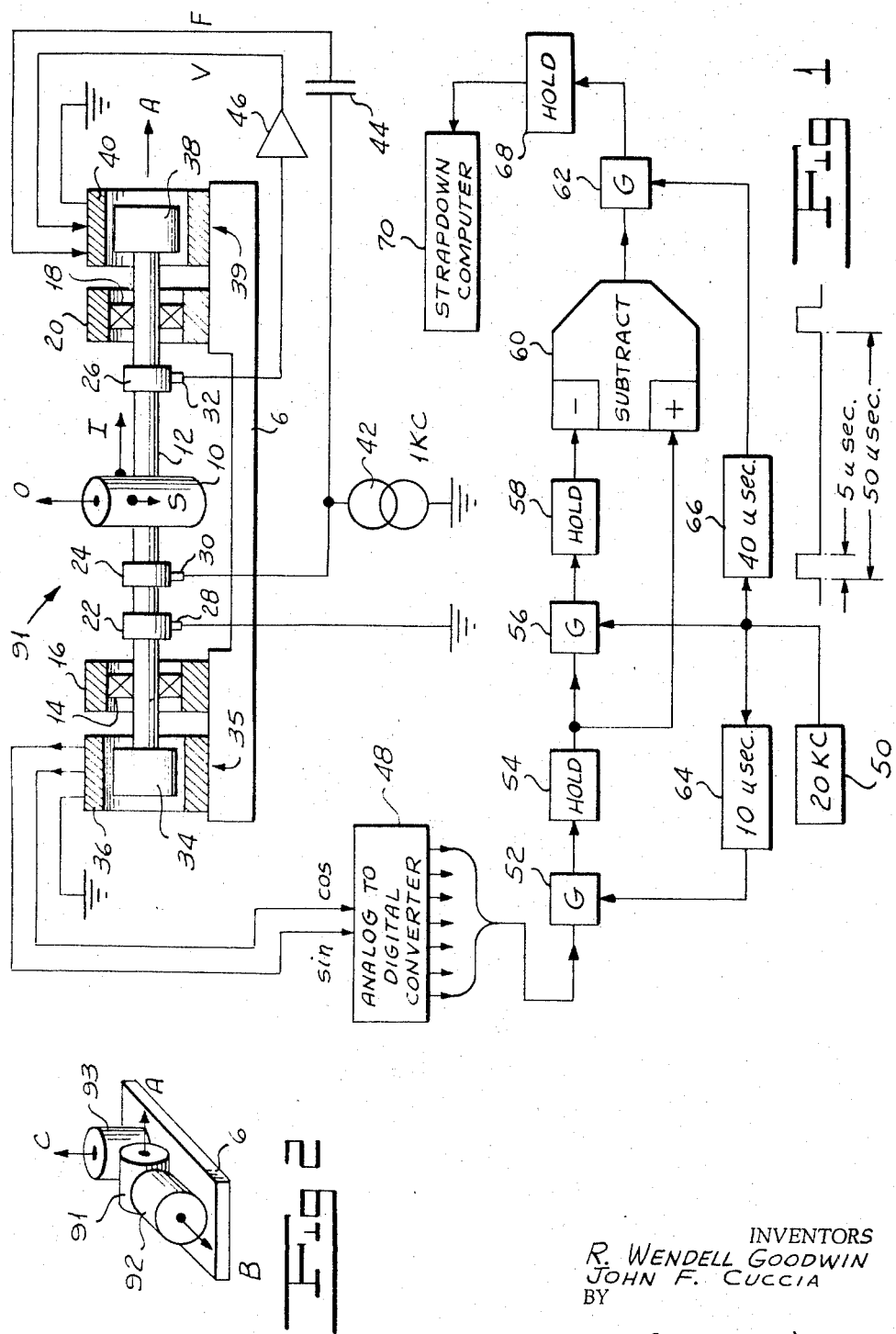

3,438,268
STRAPDOWN GYROSCOPE SYSTEM
Raymond Wendell Goodwin, Westport, Conn., and John F. Cuccia, White Plains, N.Y., assignors to United Aircraft Corporation, East Hartford, Conn., a corporation of Delaware
Filed Aug. 31, 1965, Ser. No. 484,022
Int. Cl. G01c 19/02
U.S. Cl. 74—5                13 Claims

ABSTRACT OF THE DISCLOSURE

In general our invention contemplates the provision of three single-degree-of-freedom gyroscopes. Each gyroscope is mounted upon an associated shaft for rotation about its input axis. The three shafts are independent of one another. Each shaft is provided with an angular transducer which indicates the position of the shaft. Each shaft may also be provided with a torque motor for preventing any component of rotation about the input axis of a gyroscope. The outputs of the three angular position transducers are then periodically sample. The angular differences between successive samplings are employed in performing strapdown computations which define the orientation of the vehicle relative to a reference frame.

Our invention relates to strapdown gyroscope systems and more particularly to apparatus for decreasing the dynamic range requirements of strapdown gyroscopes.

In the prior art, there are two types of gyroscope systems. One type comprises platform systems in which the gyroscopes are mounted on a stable platform which is isolated from vehicle rotation by a plurality of nested gimbals. For such platform systems, the dynamic requirements of the gyroscopes are negligible since the platform is substantially stationary relative to inertial space irrespective of vehicle rotation. Another type comprises strapdown systems in which the gyroscopes are secured to the frame of the vehicle and are thus subjected to vehicle rotation. Strapdown gyroscope systems of the prior art must accommodate the highest possible angular velocity of the vehicle. Strapdown systems, however, are small and light since the heavy and bulky multiple nested gimbals of platform systems are eliminated.

One subject of our invention is to provide a strapdown system in which the gyroscopes are not subjected to vehicle rotations.

Another object of our invention is to provide a strapdown system in which the dynamic range requirement of the gyroscopes does not exceed that of conventional platform systems.

A further object of our invention is to provide a strapdown system having a weight and bulk which is appreciably less than that of conventional platform systems.

Other and further objects of our invention will appear from the following description.

Description of the drawings

In the accompanying drawings which form part of the instant specification and which are to be read in conjunction therewith and in which like reference numerals are used to indicate like parts in the various views:

FIGURE 1 is a schematic view showing an embodiment of our invention for indicating rotation about one to the vehicle axes.

FIGURE 2 is a perspective view illustrating the orientation of components for resolving rotation about all three of the vehicle axes.

More particularly referring now to FIGURE 1 of the drawings, we provide a single-degree-of-freedom gyroscope 10 having a spin reference S, an input axis I, and an output axis 0. Gyroscope 10 is mounted on a shaft 12 for rotation about the input axis I. The gyroscope shaft 12 is journaled in bearings 14 and 18, which are carried by respective members 16 and 20 secured to the frame 6 of a vehicle. Also mounted upon shaft 12 are the rotor 34 of a multiple pole pair resolver 35 and the squirrel-cage rotor 38 of an induction torque motor 39. The assembly of components mounted on shaft 12 should be statically balanced so that no unbalance torques will arise due to linear accelerations orthogonal to the axis of shaft 12. The stator 36 of resolver 35 and the stator 40 of torque motor 39 are each secured to the vehicle frame 6. The resolver 35 may be provided with 360 pairs of poles and with an excitation winding mounted on rotor 34. The induction torque motor 39 may be a two-phase device having one pair of poles. One terminal of a one kilocycle oscillator is grounded. The other terminal of oscillator 42 is coupled through a 90 degree phase-shifting capacitor 44 to the fixed phase stator winding input F of motor 39. Shaft 12 is provided with slip rings 22, 24, and 26, which are engaged by respective stationary brushes 28, 30, and 32. As will be appreciated by those having ordinary skill in the art, gyroscope 10 is provided with a spin motor winding, a pickoff excitation winding, and a pickoff output winding. Brush 28 is grounded; and brush 30 is connected to the ungrounded terminal of oscillator 42. The resulting potential difference between slip rings 22 an 24 is impressed upon the rotor excitation winding of resolver 35 and upon the spin motor winding and the pickoff excitation winding of gyroscope 10. The pickoff output winding of gyroscope 10 is coupled to slip ring 26. Brush 32 is connected to the input of a high-gain alternating-current amplifier 46 which may be tuned for maximum response at one kilocycle. The output of amplifier 46 is connected to the variable phase stator winding input V of motor 39. The sine and cosine stator windings of resolver 35 are coupled to an analog-to-digital converter 48. Converter 48 may be of the type shown in the copending application of Manuel Selvin, Ser. No. 148,208, filed Oct. 27, 1961, now Patent No. 3,277,461. The digital outputs of converter 48 are coupled through a gate 52 to a holding or storage circuit 54. The output of storage circuit 54 is coupled to the plus input of a digital subtraction circuit 60 and is further coupled through a gate 56 to a holding circuit 58. The output of storage circuit 58 is coupled to the minus input of subtraction circuit 60. The output of subtraction circuit 60 is coupled through a gate 62 to a holding circuit 68. A clock generator 50 provides pulses of five microseconds' duration at a frequency of 20 kilocycles and a corresponding period of 50 microseconds. The output of clock pulse generator 50 enables gate 56. The output of clock pulse generator 50 is coupled through a ten microseconds' delay network 64 to enable gate 52. The output of clock pulse generator 50 is coupled through a 40 microseconds delay network 66 to enable gear 62. The output of storage circuit 68 is coupled to a conventional strapdown computer 70 which determines the angular orientation of the vehicle 6 relative to some reference frame. Strapdown computer 70 may be of the type shown in the copending application of Joseph Yamron et al., Ser. No. 164,649, filed Jan. 15, 1962, now Patent No. 3,272,972.

In operation of the circuit FIGURE 1, any rotation of gyroscope 10 relative to inertial space about its input axis I produces a pickoff output at slip ring 26 which is conducted by way of brush 32 to amplifier 46. Amplifier 46 impresses a signal on the variable phase winding input V of the induction torque motor 39 which rotates shaft 12 relative to the vehicle 6 until the pickoff output of gyroscope 10 is nulled. Thus shaft 12 is prevented from rotating about its longitudinal axis relative to inertial space irrespective of rotations of vehicle 6 about the vehicle axis A. The vehicle axis A is parallel to both the gyroscope input axis I and the longitudinal axis of shaft 12. Shaft 12 is stabilized only against vehicle rotation about the axis A. The amount of rotation of vehicle 6 relative to stabilized shaft 12 is sensed by resolver 35 which provides corresponding sine and cosine outputs. Converter 48 transforms these outputs into digital form. Upon the occurrence of each clock pulse from generator 50, gate 56 is actuated to couple into storage circuit 58 the previously sampled output of resolver 35 held in circuit 54. Ten microseconds subsequently gate 52 is actuated through delay network 64 to couple a new sampled output of resolver 35 into storage circuit 54. Subtraction circuit 60 provides the difference between the presently sampled and previously sampled outputs of resolver 35. Thirty microseconds subsequently gate 62 is actuated through delay network 66 to couple the digital difference signals to storage circuit 68. Upon the occurrence of the next clock pulse from generator 50, the output of storage circuit 54 is again transferred into storage circuit 58, then the new output of converter 48 is coupled into storage circuit 54, and finally the difference output of subtraction 60 is applied to storage circuit 68.

Multiple pole pair resolver 35 may have a resolution of .001°. High performance aircraft may have roll rates as much as 200° per second. For the 20 kilocycle sampling frequency indicated, the output of subtraction circuit 60 will be .010° at this roll rate. So long as the vehicle rotation rate does not exceed 20° per second, the output of subtraction circuit 60 will not exceed .001°, which is the resolution of the resolver.

It will be noted that we have not provided any reduction gears between the rotor 38 of the induction torque motor 39 and shaft 12. Instead rotor 38 is directly mounted on shaft 12. The provision of reduction gears would involve a reaction to the vehicle 6. In the construction shown, the only adverse torque reactions to the vehicle 6 are the friction in bearings 14 and 18 and the friction between the brushes and the slip rings. However, these frictional torques are substantially neutralized by the inherent single-phase torque of induction motor 39 which arises with relative rotation between rotor and stator even though no signals be impressed upon the variable phase winding input V. Accordingly the residual torque reaction to vehicle 6 is extremely small.

Essentially then shaft 12 is a free body having angular inertia due to the presence of rotors 34 and 38 and gyroscope 10, which is subjected only to minute residual torques. Hence, shaft 12 has a high degree of isolation from rotations of the vehicle about axis A even if no signals were applied to the variable phase winding input V of the induction torque motor.

The direct mounting of rotor 38 upon shaft 12 also results in a high frequency response for torque motor 39. Even if motor 39 were provided with two pairs of poles, its synchronous speed of 500 revolutions per second would still exceed the maximum expected rotational speed of 0.56 revolution per second by a factor of 900. The maximum output torque of motor 39 may be relatively small, since it need only exceed the sum of the bearing and brush torques by a reasonable margin of safety.

The assembly comprising shaft 12, gyroscope 10, angular transducer 35, and torque motor 39 is indicated generally by the reference numeral 91 and may be mounted within a cylindrical container.

Referring now to FIGURE 2, we provide three independently-gimballed single-degree-of-freedom gyroscope assemblies 91, 92, and 93. Each of the assemblies are secured to the vehicle frame 6. As in FIGURE 1, the axis of shaft 12 of assembly 91 is parallel to the vehicle axis A. The axis of the shaft of the assembly 92 is parallel to the vehicle axis B. The axis of the shaft of assembly 93 is parallel to the vehicle axis C. Correspondingly, the input axes of the single-degree-of-freedom gyroscopes of assemblies 92 and 93 are parallel to the respective vehicle axes B and C. Axes A, B and C are orthogonally disposed. The outputs of the angular transducers of assemblies 92 and 93 are ultimately coupled to strapdown computer 70 through circuits similar to that shown in FIGURE 1 for coupling the outputs of resolver 35 to strapdown computer 70.

In a modified form of our invention, gyroscope 10 is provided with a torquing winding which is connected to an additional slip ring on shaft 12 positioned in the space provided for this purpose between slip ring 26 and the gyroscope. The output of amplifier 46 is now coupled to a phase-sensitive detector, the direct-current output of which is applied to an additional stationary brush contacting the additional slip ring. Induction torque motor 39 is no longer required, since the pickoff output at brush 32 is nulled by the currents applied to the torquing winding. The output of the phase-sensitive detector is applied to an auxiliary analog-to-digital converter, the output of which is connected to one input of a digital adding circuit. The output of holding circuit 68 is now connected to the other input of the digital adding circuit; and the output thereof is connected to strapdown computer 70.

In such modified form of our invention, gyroscope 10 is permitted to rotate slightly about its input axis relative to inertial space. However, such rotation will be extremely small compared with rotation of the vehicle 6 about axis A, since shaft 12 is substantially a free body. The torquing currents and hence the output of the auxiliary analog-to-digital converter provide a measure of this minute rotation. Thus the rotation of the vehicle 6 about axis A, relative to inertial space, is equal to the sum of vehicle rotation relative to shaft 12 and rotation of shaft 12 relative to inertial space.

It will be seen that we have accomplished the objects of our invention. We have provided a strapdown system in which the gyroscopes are not subjected to vehicle rotation, instead the dynamic range requirement of the gyroscopes in our system does not exceed that of conventional platform systems. Our strapdown system is light and compact since the heavy and bulky multiple nested gimbals of platform systems of the prior art are eliminated.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A strapdown gyroscope system including in combination a single-degree-of-freedom gyroscope having an input axis, means mounting the gyroscope for rotation with but one degree of freedom about its input axis, means for measuring rotation of the gyroscope about its input axis relative to the mounting means, and means responsive to the measuring means for successively determining the incremental rotation which occurs during a predetermined time interval.

2. A strapdown gyroscope system including in combination a single-degree-of-freedom gyroscope having an input axis, means mounting the gyroscope for rotation about its input axis with but one degree of freedom, means for successively determining the increments of rotation of the gyroscope about its input axis relative to the mounting means, and means for controlling rotation of the gyroscope about its input axis relative to the mounting means.

3. A strapdown gyroscope system including in combination a plurality of single-degree-of-freedom gyroscopes each having an input axis, a corresponding of plurality of two-phase induction motors each having rotor and stator elements, and means mounting each gyroscope and one of the corresponding induction motor elements for common rotation with but one degree of freedom about its input axis, the input axes being orthogonally disposed.

4. A strapdown gyroscope system including in combination a single-degree-of-freedom gyroscope having an input axis, a torque motor having rotor and stator elements, an angular transducer having rotor and stator members, means mounting the gyroscope and one of the torque motor elements and one of the angular transducer members for common rotation with but one degree of freedom about the input axis of the gyroscope, and means responsive to the transducer for successively determining the incremental angular change which occurs during a predetermined time interval.

5. A strapdown gyroscope system including in combination a single-degree-of-freedom gyroscope having an input axis, an angular transducer having rotor and stator members, means mounting the gyroscope and one of said angular transducer members for common rotation with but one degree of freedom about the input axis of the gyroscope, and means responsive to the transducer for successively determining the incremental angular change which occurs during a predetermined time interval.

6. A strapdown gyroscope system including in combination a single-degree-of-freedom gyroscope having an input axis, means mounting the gyroscope for rotation with but one degree of freedom about its input axis, and means for successively determining the increments of rotation of the gyroscope about its input axis relative to the mounting means.

7. A strapdown gyroscope system including in combination a single-degree-of-freedom gyroscope having an input axis and providing an output as a function of rotation of the gyroscope about its input axis relative to inertial space, a two-phase induction motor having rotor and stator elements, an angular transducer having rotor and stator members, means mounting the gyroscope and one of the induction motor elements and one of the angular transducer members for common rotation with but one degree of freedom about the input axis of the gyroscope, means responsive to said output for controlling the induction motor, and means including the angular transducer for successively determining the increments of rotation of the gyroscope about its input axis relative to the mounting means.

8. A strapdown gyroscope system including in combination a plurality of single-degree-of-freedom gyroscopes each having an input axis, means mounting each gyroscope for rotation with but one degree of freedom about its input axis, the input axes of the gyroscopes being orthogonally disposed, means for successively determining the increments of rotation of each gyroscope about its input axis relative to the mounting means, and strapdown computing means responsive to said rotational increments for determining the orientation of the mounting means.

9. A strapdown gyroscope system including in combination a plurality of single-degree-of-freedom gyroscopes each having an input axis and providing an output as a function of rotation about its axis relative to inertial space, means mounting each gyroscope for rotation with but one degree of freedom about its input axis, the input axes of the gyroscopes being orthogonally disposed, means for controlling rotation of each gyroscope about its input axis relative to the mounting means in response to its output, means for successively determining the increments of rotation of each gyroscope about its input axis relative to the mounting means, and strapdown computing means responsive to said rotational increments for determining the orientation of the mounting means.

10. A strapdown gyroscope system including in combination a plurality of single-degree-of-freedom gyroscopes each having an input axis and a torquer, means mounting each gyroscope for rotation with but one degree of freedom about its input axis, the input axes being orthogonally disposed, and means for controlling each torquer.

11. A strapdown gyroscope system including in combination a plurality of single-degree-of-freedom gyroscopes each having an input axis and a torquer and each providing a corresponding output as a function of rotation about its input axis, means mounting each gyroscope for rotation with but one degree of freedom about its input axis, the input axes being orthogonally disposed, and means responsive to each output for controlling the torquer of the corresponding gyroscope.

12. A strapdown gyroscope system including in combination a single-degree-of-freedom gyroscope having an input axis and a torquer, means mounting the gyroscope for rotation with but one degree of freedom about its input axis, means for successively determining the increments of rotation of the gyroscope about its input axis relative to the mounting mean, means for controlling the torquer, and strapdown computing means responsive both to said rotational increments and to said torquer controlling means for determining the orientation of the mounting means.

13. A strapdown gyroscope system including in combination a single-degree-of-freedom gyroscope having an input axis and a torquer and providing an output as a function of rotation of the gyroscope about its input axis, an angular transducer having rotor and stator members, means mounting the gyroscope and one of said members for common rotation with but one degree of freedom about the input axis of the gyroscope, means responsive to said output for controlling the torquer, means including the angular transducer for successively determining the increments of rotation of the gyroscope about its input axis relative to the mounting means, and strapdown computing means responsive both to said rotational increments and to said torquer controlling means for determining the orientation of the mounting means.

References Cited

UNITED STATES PATENTS

| | | | |
|---|---|---|---|
| 2,898,766 | 8/1959 | Pittman | 74—5.34 |
| 2,928,282 | 3/1960 | La Hue | 74—5 X |
| 2,999,391 | 9/1961 | Freebairn | 74—5 X |
| 3,004,437 | 10/1961 | Pittman | 74—5.34 |
| 3,162,052 | 12/1964 | Anderson et al. | 74—5.34 X |
| 3,192,778 | 7/1965 | Ephgrave | 74—5.34 |
| 3,272,018 | 9/1966 | Watt | 74—5.34 |

C. J. HUSAR, *Primary Examiner.*

U.S. Cl. X.R

74—534